US012484697B2

(12) United States Patent
Mitchell, Jr.

(10) Patent No.: US 12,484,697 B2
(45) Date of Patent: Dec. 2, 2025

(54) WHEELCHAIR ACCESSIBLE SALON CHAIRS

(71) Applicant: Bobby Mitchell, Jr., Paramount, CA (US)

(72) Inventor: Bobby Mitchell, Jr., Paramount, CA (US)

( * ) Notice: Subject to any disclaimer, the term of this patent is extended or adjusted under 35 U.S.C. 154(b) by 0 days.

(21) Appl. No.: 18/201,693

(22) Filed: May 24, 2023

(65) Prior Publication Data

US 2025/0009131 A1 Jan. 9, 2025

(51) Int. Cl.

| | |
|---|---|
| ***A47C 1/04*** | (2006.01) |
| ***A47C 1/03*** | (2006.01) |
| ***A47C 1/06*** | (2006.01) |
| ***A47C 1/08*** | (2006.01) |
| ***A47C 1/10*** | (2006.01) |
| ***A47C 1/11*** | (2006.01) |
| ***A47C 3/30*** | (2006.01) |
| ***A47C 4/04*** | (2006.01) |
| ***A61G 5/02*** | (2006.01) |
| ***A61G 5/10*** | (2006.01) |
| ***B62M 1/14*** | (2006.01) |

(52) U.S. Cl.

CPC .............. *A47C 1/06* (2013.01); *A47C 1/0308* (2018.08); *A47C 1/04* (2013.01); *A47C 1/08* (2013.01); *A47C 1/10* (2013.01); *A47C 1/11* (2013.01); *A47C 3/30* (2013.01); *A47C 4/04* (2013.01); *A61G 5/104* (2013.01); *B62M 1/14* (2013.01); *Y10S 414/134* (2013.01)

(58) Field of Classification Search

CPC .. A47C 1/04; A47C 1/08; A47C 7/024; A47C 11/005; A47C 1/06; A47C 1/11; B62M 1/14; A61G 5/104; Y10S 414/134

USPC ................ 297/217.7, 232, 233, 234, 256.16; 280/250.1, 647, 304.1; 414/253, 921

See application file for complete search history.

(56) References Cited

U.S. PATENT DOCUMENTS 1,370,986 A * 3/1921 Mudd ...................... A47C 1/11 297/234 X
1,630,432 A * 5/1927 Hydorn .................. A47C 7/024 297/232
1,807,262 A * 5/1931 Wages ..................... A47C 1/11 297/232
2,665,746 A * 1/1954 Darter ...................... A47C 1/11 297/232
2,743,766 A * 5/1956 Bartman .................. A47C 1/11 297/232

(Continued)

*Primary Examiner* — Rodney B White

(74) *Attorney, Agent, or Firm* — UCLA Patent Law Clinic

(57) ABSTRACT

Systems and methods for accessible salon chairs in accordance with embodiments of the invention are disclosed. In one embodiment, an accessible salon chair is provided and comprises: a backrest; a rotatable base around a vertical axis; a set of rotatable armrests capable of being folded; a foldable seat that is connected to the backrest via at least one rotatable hinge, is capable of being folded and locked to accommodate the wheelchair; a platform comprising a flat surface and a base, is located below the foldable seat and capable of receiving and holding the wheelchair; a ramp connected to the platform and able to receive the wheelchair; and a pumping device connected to a bottom of the base of the platform capable of adjusting the height of the salon chair.

18 Claims, 5 Drawing Sheets

(56) References Cited

U.S. PATENT DOCUMENTS

| | | | | | |
|---|---|---|---|---|---|
| 4,726,730 | A * | 2/1988 | McConnell | A61G 5/104 | 414/921 X |
| 4,790,716 | A * | 12/1988 | McConnell | A61G 5/104 | 414/921 X |
| 4,834,411 | A * | 5/1989 | Willey | A61G 5/104 | 280/250.1 X |
| 5,040,939 | A * | 8/1991 | Booth | A61G 5/104 | 414/921 X |
| 5,346,280 | A * | 9/1994 | Deumite | A61G 5/14 | 297/DIG. 10 |
| 5,466,111 | A * | 11/1995 | Meyer | B60N 2/245 | 414/921 X |
| 5,472,307 | A * | 12/1995 | Kadlec | A61G 5/1054 | 414/921 X |
| 6,463,597 | B2 * | 10/2002 | Ishimura | A45D 19/10 | 4/515 |
| 6,793,232 | B1 * | 9/2004 | Wing | A61G 7/1067 | 280/304.1 X |
| 6,866,288 | B2 * | 3/2005 | Martin | A61G 5/121 | 280/647 X |
| 7,549,703 | B2 * | 6/2009 | McElhinney | A61G 5/104 | 280/304.1 X |
| 8,672,356 | B2 * | 3/2014 | Inaguma | A61G 3/08 | 280/250.1 X |
| 8,783,770 | B2 * | 7/2014 | Tanaka | A61G 5/128 | 297/284.3 |
| 9,333,132 | B2 * | 5/2016 | Bruestle | A61G 5/104 | |
| 2006/0261659 | A1 * | 11/2006 | Dykes | A47C 7/541 | 297/411.37 |
| 2007/0096525 | A1 | 5/2007 | McElhinney | | |
| 2008/0031718 | A1 * | 2/2008 | Ross | A61G 5/104 | 414/781 |
| 2009/0257855 | A1 * | 10/2009 | Iannelli | A61G 5/104 | 414/540 |
| 2011/0304186 | A1 * | 12/2011 | Andrews | A61G 7/1026 | 280/647 X |
| 2012/0037780 | A1 * | 2/2012 | Colon O'Neill | A61G 15/00 | 248/161 |
| 2018/0214330 | A1 | 8/2018 | Cooper et al. | | |

* cited by examiner

WHEELCHAIR ACCESSIBLE SALON CHAIRS

BACKGROUND

Salon chairs are an essential piece of furniture for hair and beauty salons. They are designed to provide comfort and support for clients during various salon services, such as haircuts, styling, coloring, and more. Traditional salon chairs often feature a swiveling base, adjustable height, and reclining capabilities to accommodate the diverse needs of clients and professionals alike.

SUMMARY OF THE INVENTION

The various embodiments of the present wheelchair accessible salon chair (may also be referred to here as "accessible salon chairs") contain several features, no single one of which is solely responsible for their desirable attributes. Without limiting the scope of the present embodiments, their more prominent features will now be discussed below. In particular, the present wheelchair accessible salon chair will be discussed in the context of loading a wheelchaired patron onto an accessible salon chair. However, the use of wheelchair accessible salon chairs is merely exemplary and various other embodiments of the accessible salon chair may be utilized for accommodating a wheelchaired patron as appropriate to the requirements of a specific application in accordance with various embodiments of the invention. After considering this discussion, and particularly after reading the section entitled "Detailed Description," one will understand how the features of the present embodiments provide the advantages described here.

One aspect of the present embodiments includes the realization that there are significant challenges in making salon chairs accessible to individuals who use wheelchairs. For example, individuals who rely on wheelchairs for mobility often face barriers in accessing hair and beauty services due to the limitations of conventional salon chair designs. The present embodiments solve this problem by creating an accessible salon chair that accommodates a wheelchaired patron.

Another aspect of the present embodiment includes the realization that in current salon chairs, other than the present embodiments, a wheelchaired patron must be removed from the wheelchair in order to be seated in a salon chair. This may be difficult and arduous for a wheelchaired patron, particularly if a caretaker is not present. In addition, this transfer process may also pose risks for both clients and salon professionals, such as the potential for falls or injuries. The present embodiments solve this problem by creating an accessible salon chair that accommodates a wheelchaired patron without having to remove the patron from the wheelchair. Additionally, the present embodiments solve this problem while maintaining the accessible salon chair's functionality and use for non-wheelchaired patrons. The present embodiments thus advantageously enable an adjustable salon chair with a ramp, platform, and foldable or rotatable parts that convert the accessible salon chair from a configuration that seats a non-wheelchaired patron (may be referred to herein as a "folded configuration") to a configuration that seats a wheelchaired patron without removing the patron from the wheelchair (may be referred to herein as an "access configuration"). The present embodiments provide these advantages and enhancements, as described below.

In a first aspect, a salon chair for a patron in a wheelchair comprises: a backrest; a rotatable base configured to rotate the salon chair around a vertical axis; a set of rotatable armrests, wherein the set of rotatable armrests are capable of being folded; a foldable seat, wherein the foldable seat is connected to the backrest via at least one rotatable hinge, and wherein the foldable seat is capable of being folded to accommodate the wheelchair, and wherein the foldable seat can be locked; a platform comprising a flat surface and a base, wherein the platform is located below the foldable seat, and wherein the platform is capable of receiving and holding the wheelchair; a ramp connected to the platform, wherein the ramp receives the wheelchair; and a pumping device connected to a bottom of the base of the platform, wherein the pumping device is capable of changing the height of the salon chair to lower the salon chair to receive the wheelchair and elevate the salon chair.

In an embodiment of the first aspect, the set of rotatable armrests are connected to the backrest in a posterior position relative to the patron.

In another embodiment of the first aspect, the platform is capable of holding a weight of at least 550 pounds.

In another embodiment of the first aspect, the salon chair further comprises at least one retractable tie strap, wherein the retractable tie straps are connected to the wheelchair to secure the wheelchair on the platform.

In another embodiment of the first aspect, the salon chair further comprises at least one adjustable clasp, wherein the adjustable clasps are connected to the retractable tie straps, and wherein the adjustable clasps connect to the wheelchair to secure the wheelchair on the platform.

In another embodiment of the first aspect, the salon chair further comprises at least one rotatable axle, wherein the retractable tie straps are wrapped around the rotatable axles, and wherein the rotatable axles rotate in a release direction to extend the tie straps, and wherein the rotatable axles rotate opposite to the release direction to retract the tie straps.

In another embodiment of the first aspect, the rotatable axles are located within the platform, and wherein the rotatable axles rotate to release or retract in the retractable tie straps in a direction perpendicular to the foldable armrests when folded.

In another embodiment of the first aspect, the rotatable axles comprise a locking mechanism that secures the retractable tie straps in place to maintain the position of the wheelchair on the platform.

In another embodiment of the first aspect, the foldable seat is connected to the backrest via a set of rotatable hinges, and wherein the foldable seat can be locked in a vertical position.

In another embodiment of the first aspect, the salon chair further comprises a headrest, wherein the headrest is adjustable along a horizontal axis to fit to the patron.

In another embodiment of the first aspect, the pumping device comprises a hydraulic pump by which to elevate or lower the salon chair.

In another embodiment of the first aspect, the salon chair further comprises a lever by which to control the hydraulic pump to change the height of the salon chair.

In another embodiment of the first aspect, the pumping device comprises an electric motor by which to elevate or lower the salon chair.

In another embodiment of the first aspect, the salon chair further comprises one or more actuation inputs, wherein the actuation inputs are configured to control the electric motor, and wherein the actuation inputs perform a specific, preprogrammed function when activated.

In another embodiment of the first aspect, the salon chair further comprises a microcontroller operatively connected to the actuation inputs, wherein the microcontroller is configured to receive a signal from the actuation inputs when activated, and wherein the microcontroller translates the signal into a command for the electric motor, wherein the command corresponds to the function of the activated actuation inputs.

In another embodiment of the first aspect, the salon chair further comprises a housing unit configured to enclose the actuation inputs and the microcontroller.

In another embodiment of the first aspect, the housing unit comprises a lid, and wherein the lid is configured to be lockable when in a closed configuration.

In another embodiment of the first aspect, the ramp further comprises a lock to secure the ramp in its position to hold the wheelchair on the platform.

In another embodiment of the first aspect, the ramp further comprises an extension ramp, wherein the extension ramp is connected to the ramp to extend the length of the ramp, and wherein the extension ramp is detachable from the ramp.

In another embodiment of the first aspect, the platform comprises a water-resistant surface.

BRIEF DESCRIPTION OF THE DRAWINGS

The various embodiments of the wheelchair accessible salon chair now will be discussed in detail with an emphasis on highlighting the advantageous features. These embodiments depict the novel and non-obvious wheelchair accessible salon chair shown in the accompanying drawings, which are for illustrative purposes only. These drawings include the following figures.

DETAILED DESCRIPTION OF THE DRAWINGS

Figure 1:
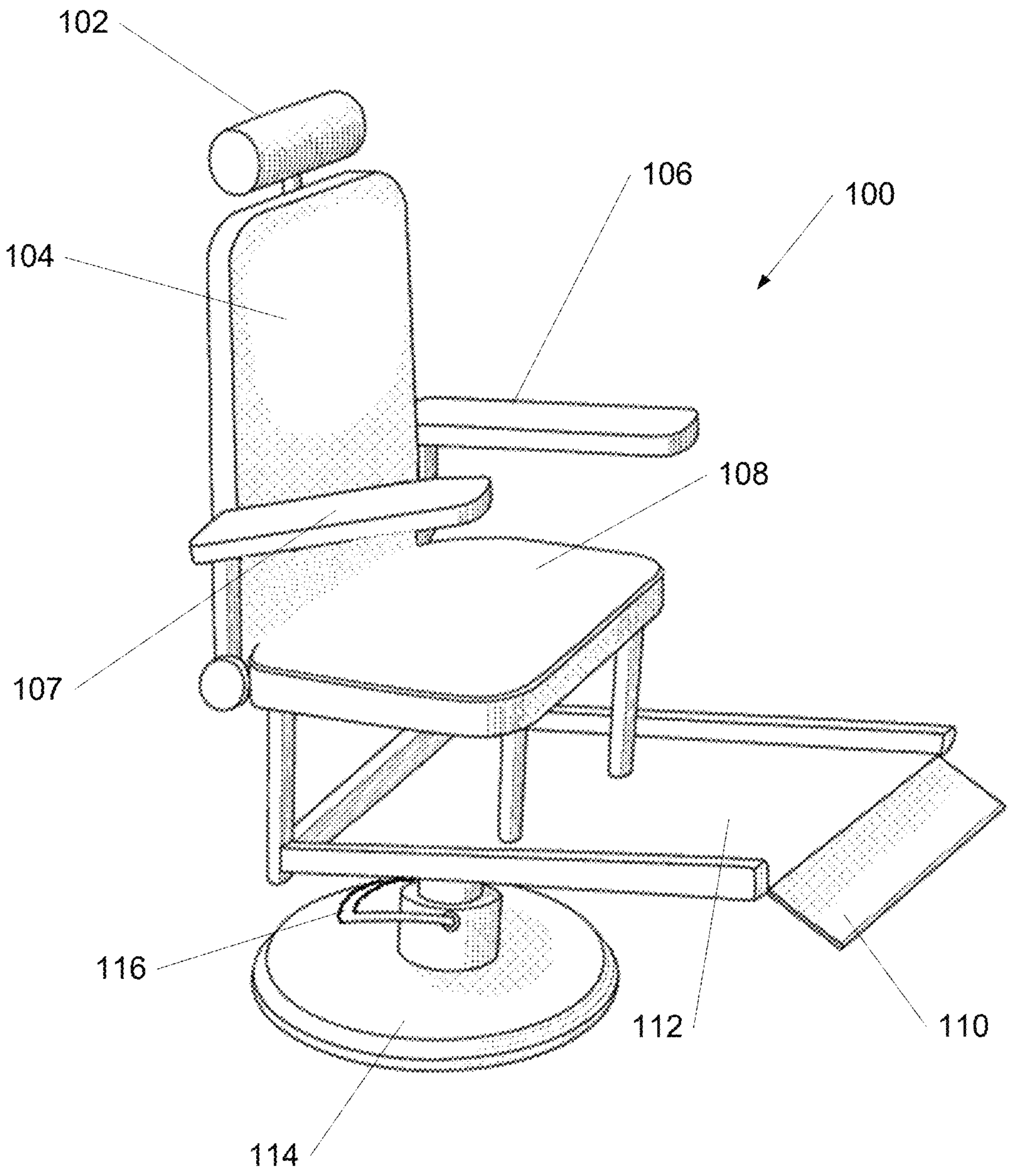
FIG. 1 is a diagram illustrating a wheelchair accessible salon chair in a folded configuration in accordance with an embodiment of the invention.

The following detailed description describes the present embodiments with reference to the drawings. In the drawings, reference numbers label the elements of the present embodiments. These reference numbers are reproduced below in connection with the discussion of the corresponding drawing features.

Turning now to the drawings, wheelchair accessible salon chairs (may also be referred to here as "accessible salon chairs") in accordance with embodiments of the invention are illustrated. In many embodiments, wheelchair accessible salon chairs may accommodate a patron in a wheelchair without the need to transfer them out of their wheelchair. In addition, the wheelchair accessible salon chairs may also accommodate non-wheelchair patrons. For example, accessible salon chairs may include a folded configuration for non-wheelchair patrons and an access configuration for wheelchair patrons, as further described below. In addition, accessible salon chairs may transition from between the folded and access configurations, as further described below. In this way, accessible salon chairs may be used for non-wheelchaired and wheelchaired patrons. Wheelchair accessible salon chairs having folded configurations in accordance with embodiments of the invention are further discussed below.

Folded Configuration of Wheelchair Accessible Salon Chairs

As described above, wheelchair accessible salon chairs may include a folded configuration. In such configurations, the foldable seat may accommodate a non-wheelchair patron. As further described below, in these embodiments, the foldable seat may be positioned horizontally to allow the non-wheelchair patron to sit on the foldable seat. In some embodiments, the foldable seat may be rotated downward, such that the foldable seat is configured vertically allowing for the accessible salon chair to transition from the folded configuration to the access configuration, as further described below.

A diagram illustrating a wheelchair accessible salon chair in a folded configuration in accordance with an embodiment of the invention is shown in FIG. 1. The accessible salon chair 100 includes a detachable headrest 102 configured to connect with a backrest 104. In many embodiments, the backrest 104 may provide support to a patron by allowing them to lean against it. Likewise, the detachable headrest 102 may be utilized by the patron to rest their head. In the folded configuration, the detachable headrest 102 may be attached to the backrest 104 but in the access configuration, the detachable headrest 102 may be detached, as further described below.

In reference to FIG. 1, the accessible salon chair 100 may also include a set of rotatable armrests 106, 107 that are configured to rotate upwards or downwards. In several embodiments, the set of rotatable armrests 106 may be rotated and adjusted to extend perpendicularly from the backrest 104. The accessible salon chair 100 may also include a foldable seat 108 that may be connected to the backrest 104 and may be configured to rotate using various methods. For instance, the foldable seat 108 may be connected to the backrest 104 via one or more hinges 118. In the folded configuration, the foldable seat 108 may be secured (e.g., locked) into place, allowing the patron to sit on the foldable seat 108. As further described below, in the access configuration, the hinges 118 may allow for the foldable seat 108 to rotate downwards. In some embodiments, the hinges 118 may include a locking mechanism to secure the foldable seat 108 in place in either the folded configuration or in the access configuration. In some embodiments, the platform 112 may be positioned or affixed below the foldable seat 108. In this way, the surface of the platform 112 may act as a surface on which patrons place their feet while seated on the foldable seat 108.

In further reference to FIG. 1, the accessible salon chair 100 may include a platform 112 that may be utilized as a footrest for the patron in the folded configuration.

In some embodiments, the platform 112 may be connected to a ramp 110. In many embodiments, the ramp 110 may be rotated downwards or upwards. In some embodiments, the ramp 110 may fold up (or fold down) for storage. For example, in the folded configuration, the ramp 110 may not be needed, and it may be folded onto or below the platform 112. In some embodiments, the ramp 110 may be tucked into the platform 112.

In further reference to FIG. 1, the accessible salon chair 100 may include a pumping device 116 that may be utilized to elevate or lower the accessible salon chair 100. In many embodiments, the pumping device 116 is connected to a base 114 that allows for rotation and provides support to the accessible salon chair 100. For example, the rotatable base 114 may be in contact with a floor. In some embodiments, the rotatable base 114 may be various shape (e.g., a circular or oval plate) to prevent the accessible salon chair 100 from tipping over. In particular, the rotatable base 114 should be shaped and sized to account for a patron in both the folded configuration and for a wheelchaired patron in the access configuration. In some embodiments, the rotatable base 114 may be further secured to the floor using attachment(s) such as, but not limited to, nuts and bolts. In various embodiments the pumping device 116 and the rotatable base 114 allow the accessible salon chair 100 to rotate about a vertical axis and to raise and lower the salon chair along the same axis via the pump device 116.

Although specific folded configurations of accessible salon chairs are discussed above with respect to FIG. 1, any of a variety of folded configurations and accessible salon chairs including various components as appropriate to the requirements of a specific application can be utilized in accordance with embodiments of the invention. Access configurations of wheelchair accessible salon chairs in accordance with embodiments of the invention are further described below.

Access Configuration of Wheelchair Accessible Salon Chairs

Accessible salon chairs in the access configuration can be utilized to serve patrons in a wheelchair without requiring the patron leave their wheelchair. In the access configuration, wheelchair accessible salon chairs may receive a wheelchair. For example, the accessible salon chair may be lowered and the ramp, located at one end of the platform, may be angled downward to create a surface that enables the patron's wheelchair to move onto (and off of) the accessible salon chair. In this way, the ramp serves as a pathway for the wheelchair to reach the platform and, additionally, may be closed and locked to provide further support in securing the wheelchair on the platform.

Figure 2:
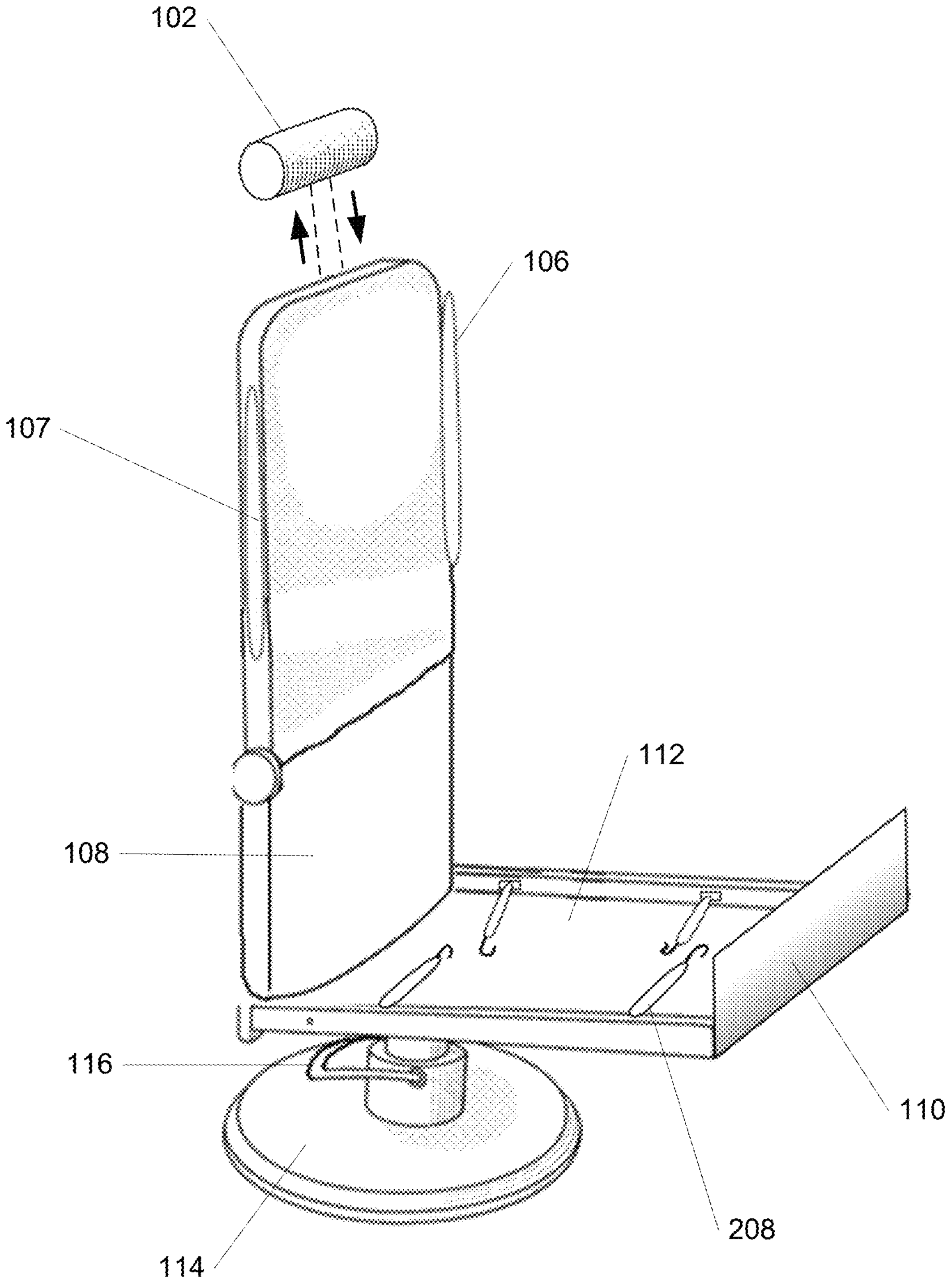
FIG. 2 is a diagram illustrating a wheelchair accessible salon chair in an access configuration in accordance with an embodiment of the invention.

A diagram illustrating a wheelchair accessible salon chair in an access configuration in accordance with an embodiment of the invention is shown in FIG. 2. As described above, wheelchair accessible salon chair may include a detachable headrest 102, a foldable seat 108, at least one rotatable armrest 106, 107, a platform 112, a ramp 110, pumping device 116, and/or a rotatable base 114. In many embodiments, the detachable headrest 102 may be removed to facilitate the access of wheelchaired patrons. In several embodiments, the set of rotatable armrests 106, 107 are rotated upward to create space for the wheelchair.

In reference to FIG. 2, the pumping device 116 may be utilized to lower the accessible salon chair to a level that allows the wheelchair to access the ramp 110 and board onto the platform 112. In many embodiments, the wheelchair may rest on the platform 112, as further described below. For example, the platform 112 may act as a surface which holds the wheelchair. In some embodiments, the platform 112 may include a securing mechanism such as, but not limited to, at least one retractable strap 208. In these embodiments, the retractable straps 208 may attach and secure the wheelchair once the wheelchair has been placed on the platform 112. In such embodiments, the retractable straps 208 may serve to hold the wheelchair in place. In some embodiments, the platform 112 may also contain a slip-resistant material to further secure the wheelchair in place.

Although specific access configurations of accessible salon chairs are discussed above with respect to FIG. 2, any of a variety of access configurations and accessible salon chairs including various components as appropriate to the requirements of a specific application can be utilized in accordance with embodiments of the invention. Receiving and securing wheelchairs on accessible salon chairs in accordance with embodiments of the invention are further described below.

Receiving and Securing Wheelchairs

Figure 3:
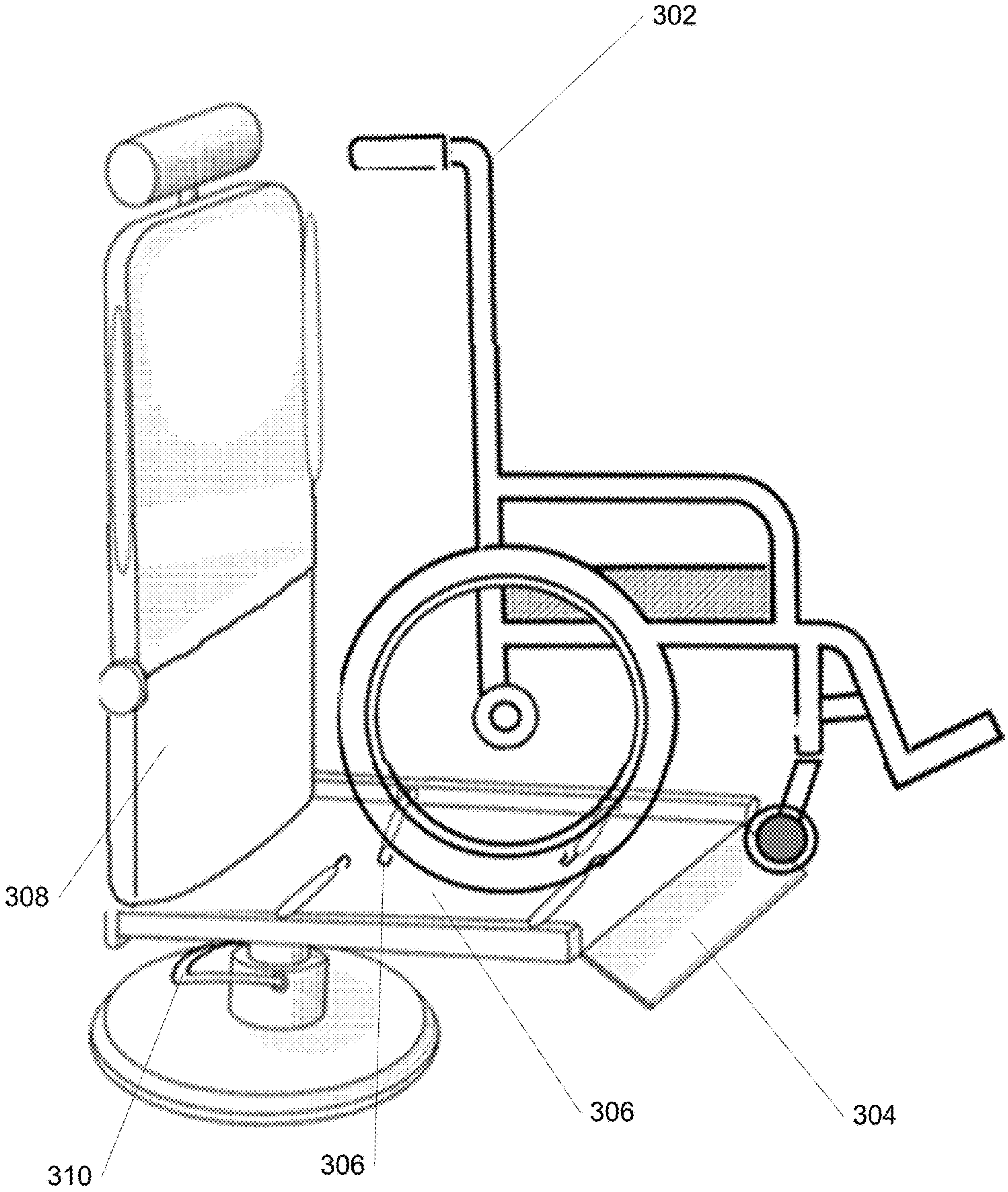
FIG. 3 is a diagram illustrating a wheelchair accessible salon chair receiving a wheelchair in accordance with an embodiment of the invention.

Accessible salon chairs enable a patron in a wheelchair to access the salon chair without leaving the wheelchair. A diagram illustrating a wheelchair accessible salon chair receiving a wheelchair in accordance with an embodiment of the invention is shown in FIG. 3. In many embodiments, a wheelchair 302 may roll up a ramp 304 to a platform 306. For example, the ramp 304 may be lowered to a position that is in contact with a floor that allows the wheelchair 302 to move from the floor to the platform 306 via the ramp 304. In some embodiments, the wheelchair accessible salon chair may not include ramp 304, and the platform 306 may itself be positioned to be level with the floor allowing the wheel chair 302 to roll up onto the platform 306. In some embodiments, a pumping device 310 may be attached to and/or include a hydraulic system that works to elevate or lower the accessible salon chair. In some embodiments, the pumping device 310 may function via an electric motor that elevates or lowers the accessible salon chair.

Figure 4:
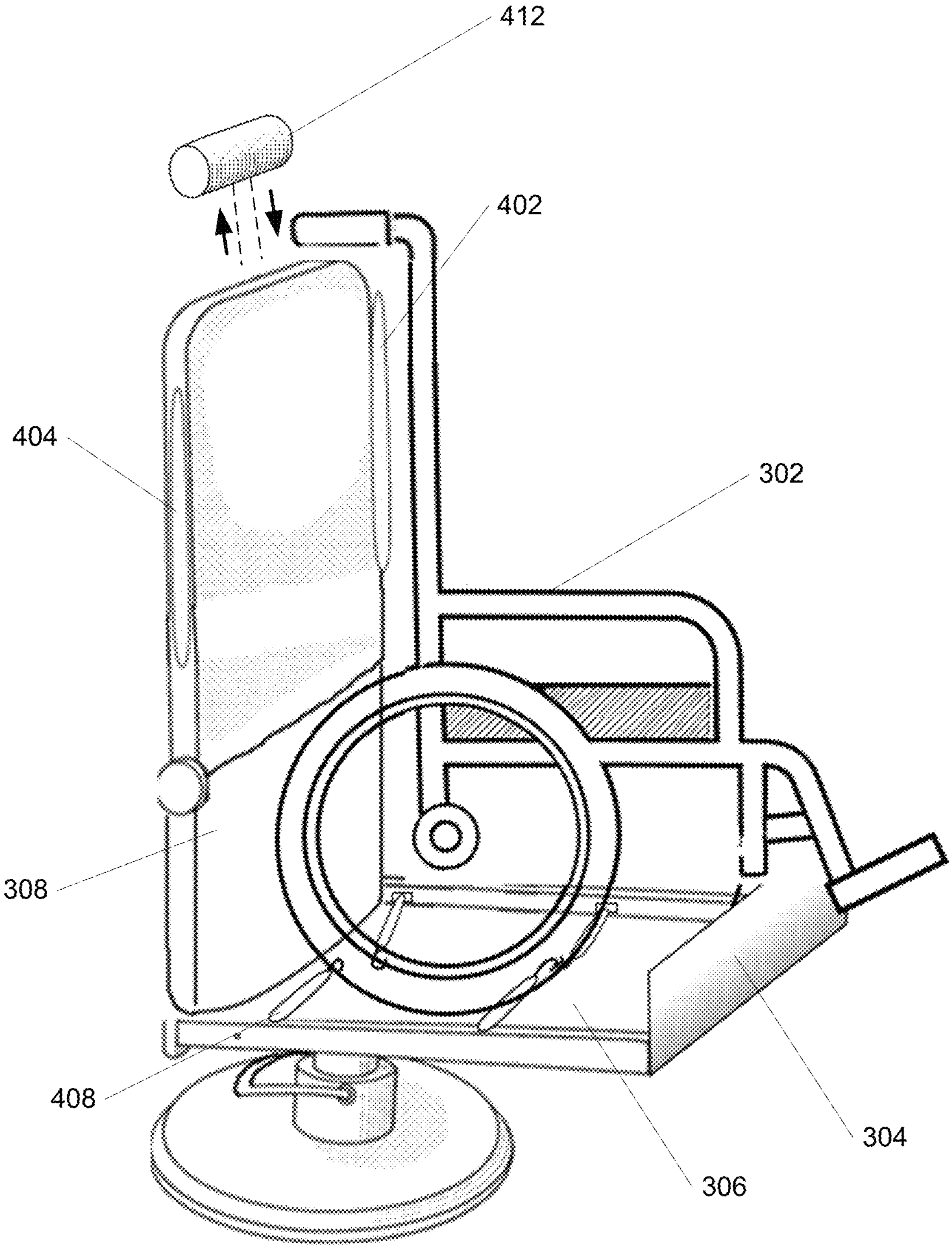
FIG. 4 is a diagram illustrating a wheelchair accessible salon chair securing a wheelchair in accordance with an embodiment of the invention.

A diagram illustrating a wheelchair accessible salon chair securing a wheelchair in accordance with an embodiment of the invention is shown in FIG. 4. In many embodiments, the accessible salon chair may be in an access configuration when receiving and/or securing a wheelchair. As further described above, in the access configuration, the rotatable seat 308 may be rotated downwards to create the space on the platform 306 to accommodate the wheelchair 302. Further, a detachable headrest 412 may be removed from the accessible salon chair to further accommodate the wheelchair 302. In addition, one or more armrests 402, 404 may be rotated to a vertical configuration to create space for the wheelchair 302 on the platform 306.

In reference to FIG. 4, the wheelchair 302 may be secured on the platform 306 using a securing mechanism, such as, but not limited to, at least one retractable strap 408 that may connect to the wheelchair 302. For example, the retractable straps 408 may be utilized to stabilize the position of the wheelchair 302 on top of the platform 306. In some embodiments, the retractable straps 408 may be contained within a frame of the platform 306. In some embodiments, the retractable straps 408 may extend and/or retract via a locking mechanism to further stabilize the wheelchair 302. In some embodiments, the ramp 304 may be rotated to a vertical position to secure the wheelchair 302 on the platform 406. In such embodiments, the ramp 304 in the vertical position may limit forward motion by the wheelchair 302 thereby securing the wheelchair 302 in place.

Although specific processes for receiving and securing wheelchairs onto accessible salon chairs are discussed above with respect to FIGS. 3 and 4, any of a variety of processes for receiving and securing wheelchairs on accessible salon chairs as appropriate to the requirements of a specific application can be utilized in accordance with embodiments of the invention. Processes for transitioning a wheelchair accessible salon chair from a folded configuration to an access configuration in accordance with embodiments of the invention are further described below.

Processes for Transitioning from a Folded Configuration to an Access Configuration Accessible salon chairs may be utilized by both wheelchaired and non-wheelchaired patrons. For non-wheelchaired patrons, the accessible salon chair may be configured in the folded configuration, as further discussed above. For example, a non-wheelchaired patron may be seated on the foldable seat and the platform may be utilized as a footrest. For wheelchaired patrons, the accessible salon chair may be transitioned from the folded to the access configuration, as described herein.

Figure 5:
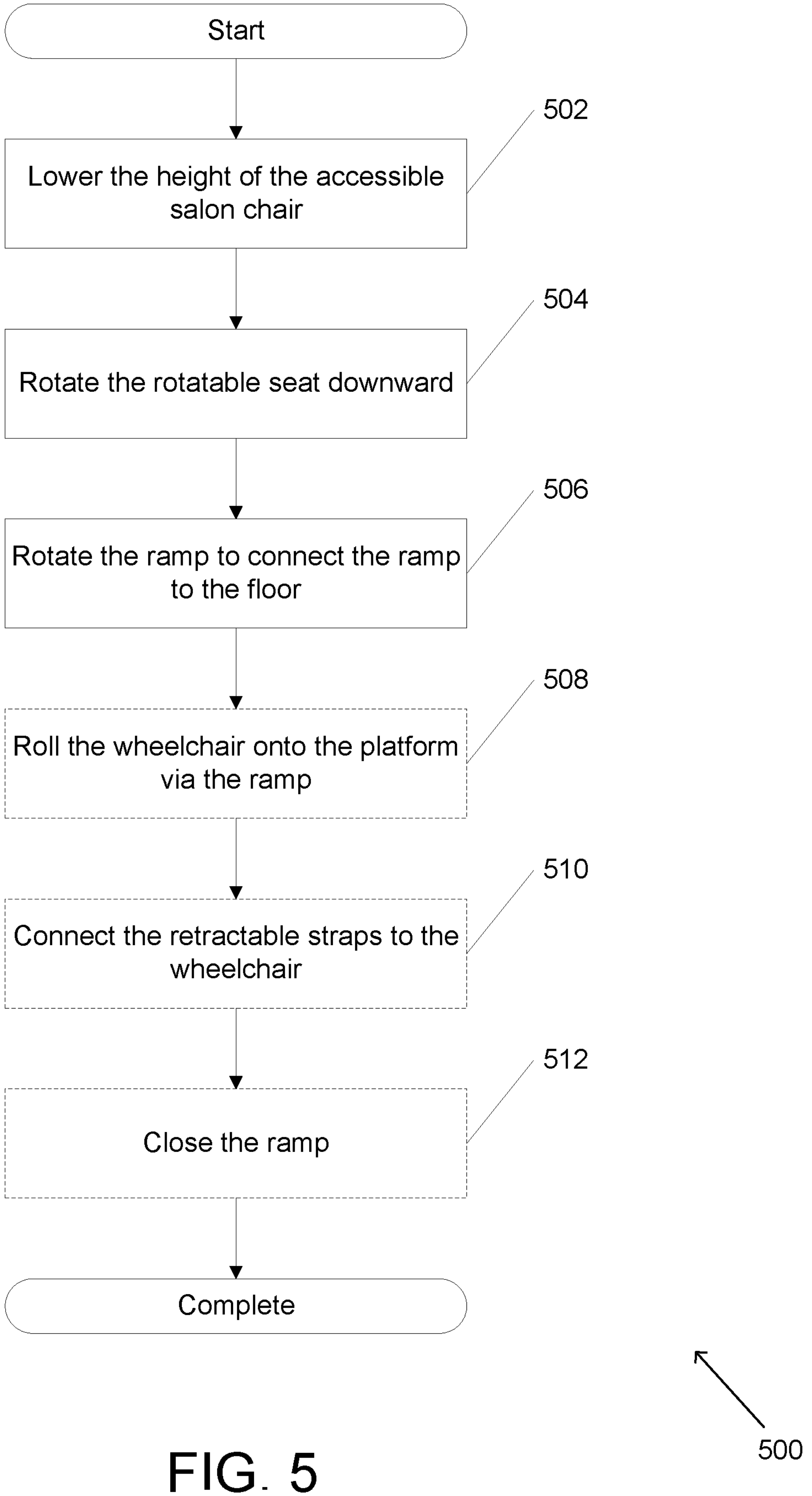
FIG. 5 is a flowchart describing a process for transitioning a wheelchair accessible salon chair from a folder configuration to an access configuration in accordance with an embodiment of the invention.

A flowchart describing a process for transitioning a wheelchair accessible salon chair from a folder configuration to an access configuration in accordance with an embodiment of the invention is shown in FIG. 5. The process 500 may include lowering (502) the height of the accessible salon chair. For example, the height of the accessible salon chair may be performed using the pumping device, as further described above. The process 500 may also include rotating (504) the rotatable seat downward. By rotating downward, the rotatable seat may open and free up space on the platform to hold the wheelchair. Further, the process 500 may also include rotating (506) the ramp downward to the floor allowing the wheelchair to roll onto the platform, as further described above. In addition, the process 500 also include rolling (508) the wheelchair onto the platform via the ramp, as further described above.

In further reference to FIG. 5, in some embodiments, the process 500 may include connecting (512) retractable straps to the wheelchair (512) in order to secure the wheelchair on the platform. In some embodiments, the process 500 may further include closing (514) the ramp to further secure the wheelchair to the access salon chair, as further described above.

Although specific processes for transitioning a wheelchair accessible salon chair from a folded configuration to an access configuration are describe above with respect to FIG. 5, any of a variety of processes for transitioning a wheelchair accessible salon chair from a folded configuration to an access configuration as appropriate to the requirements of a specific application can be utilized in accordance with embodiments of the invention. While the above description contains many specific embodiments of the invention, these should not be construed as limitations on the scope of the invention, but rather as an example of one embodiment thereof. It is therefore to be understood that the present invention may be practiced otherwise than specifically described, without departing from the scope and spirit of the present invention. Thus, embodiments of the present invention should be considered in all respects as illustrative and not restrictive.

What is claimed is:

1. A salon chair for a patron in a wheelchair, the salon chair comprising:

a backrest;

a rotatable base configured to rotate the salon chair around a vertical axis;

a set of rotatable armrests, wherein the set of rotatable armrests are capable of being folded;

a foldable seat, wherein the foldable seat is connected to the backrest via at least one rotatable hinge, and wherein the foldable seat is capable of being folded to accommodate the wheelchair, and wherein the foldable seat can be locked;

a platform comprising a flat surface and a base, wherein the platform is located below the foldable seat, and wherein the platform is capable of receiving and holding the wheelchair;

a ramp connected to the platform, wherein the ramp receives the wheelchair and the ramp further comprises a lock to secure the ramp in its position to hold the wheelchair on the platform; and a pumping device connected to a bottom of the base of the platform, wherein the pumping device is capable of changing the height of the salon chair to lower the salon chair to receive the wheelchair and elevate the salon chair.

2. The salon chair of claim 1, wherein the set of rotatable armrests are connected to the backrest in a posterior position relative to the patron.

3. The salon chair of claim 1, wherein the platform is capable of holding a weight of at least 550 pounds.

4. The salon chair of claim 1, further comprising at least one retractable tie strap, wherein the retractable tie straps are connected to the wheelchair to secure the wheelchair on the platform.

5. The salon chair of claim 4, further comprising at least one adjustable clasp, wherein the adjustable clasps are connected to the retractable tie straps, and wherein the adjustable clasps connect to the wheelchair to secure the wheelchair on the platform.

6. The salon chair of claim 4, further comprising at least one rotatable axle, wherein the retractable tie straps are wrapped around the rotatable axles, and wherein the rotatable axles rotate in a release direction to extend the tie straps, and wherein the rotatable axles rotate opposite to the release direction to retract the tie straps.

7. The salon chair of claim 6, wherein the rotatable axles are located within the platform, and wherein the rotatable axles rotate to release or retract in the retractable tie straps in a direction perpendicular to the foldable armrests when folded.

8. The salon chair of claim 6, wherein the rotatable axles comprise a locking mechanism that secures the retractable tie straps in place to maintain the position of the wheelchair on the platform.

9. The salon chair of claim 1, wherein the foldable seat is connected to the backrest via a set of rotatable hinges, and wherein the foldable seat can be locked in a vertical position.

10. The salon chair of claim 1, wherein the pumping device comprises a hydraulic pump by which to elevate or lower the salon chair.

11. The salon chair of claim 10, further comprising a lever by which to control the hydraulic pump to change the height of the salon chair.

12. The salon chair of claim 1, wherein the pumping device comprises an electric motor by which to elevate or lower the salon chair.

13. The salon chair of claim 12, further comprising one or more actuation inputs, wherein the actuation inputs are configured to control the electric motor, and wherein the actuation inputs perform a specific, preprogrammed function when activated.

14. The salon chair of claim 13, further comprising a microcontroller operatively connected to the actuation inputs, wherein the microcontroller is configured to receive a signal from the actuation inputs when activated, and wherein the microcontroller translates the signal into a command for the electric motor, wherein the command corresponds to the function of the activated actuation inputs.

15. The salon chair of claim 14, further comprising a housing unit configured to enclose the actuation inputs and the microcontroller.

16. The salon chair of claim 15, wherein the housing unit comprises a lid, and wherein the lid is configured to be lockable when in a closed configuration.

17. The salon chair of claim 1, wherein the ramp further comprises an extension ramp, wherein the extension ramp is connected to the ramp to extend the length of the ramp, and wherein the extension ramp is detachable from the ramp.

18. The salon chair of claim 1, wherein the platform comprises a water-resistant surface to prevent the wheelchair from slipping and further securing the wheelchair on the platform.

* * * * *